March 1, 1960 W. KOOISTRA 2,926,996
REDUCTION OF AQUEOUS SOLUTIONS OF CHLORINE DIOXIDE
BY MEANS OF ALKALI OR ALKALINE EARTH AMALGAM
Filed Dec. 17, 1954 3 Sheets-Sheet 3
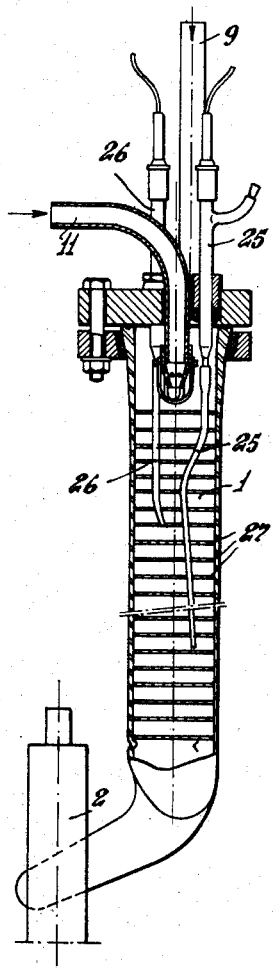
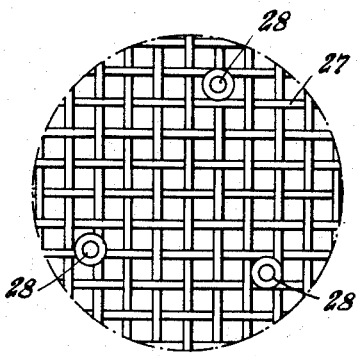
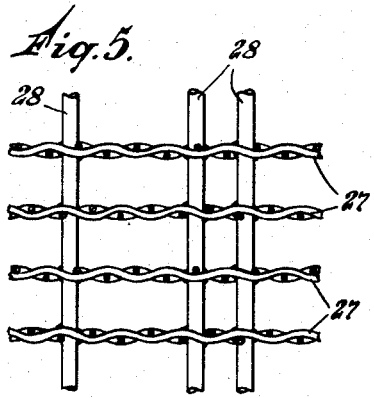
*INVENTOR.*
WILLEM KOOISTRA
BY
*ATTORNEYS*

United States Patent Office 2,926,996
Patented Mar. 1, 1960

2,926,996

REDUCTION OF AQUEOUS SOLUTIONS OF CHLORINE DIOXIDE BY MEANS OF ALKALI OR ALKALINE EARTH AMALGAM

Willem Kooistra, Delft, Netherlands, assignor to N.V. Koninklijke Nederlandsche Zoutindustrie, Boortorenweg, Hengelo, Netherlands, a corporate body of the Netherlands Application December 17, 1954, Serial No. 476,034

Claims priority, application Netherlands December 19, 1953

4 Claims. (Cl. 23—85)

The invention relates to a process, particularly a continuous process, and to a device for the production of alkali or earth alkali chlorite by reduction of aqueous solutions of chlorine dioxide by means of alkali or earth alkali amalgam.

In the processes for the preparation of alkali or earth alkali chlorite from chlorine dioxide solutions by means of alkali or earth alkali amalgam the yield is highly dependent on the secondary reactions taking place. When e.g. sodium amalgam is used besides the desired main reactions $$ClO_2 + e \rightarrow ClO_2^- \quad (1)$$
$$Na(Hg_x) \rightarrow Na^+ + (Hg_x) + e \quad (2)$$

the following side reactions $$ClO_2^- + 2H_2O + 4e \rightarrow Cl^- + 4OH^- \quad (3)$$
$$2OH^- + 2ClO_2 \rightarrow ClO_2^- + ClO_3^- + H_2O \quad (4)$$
$$2Hg \rightarrow Hg_2^{++} + 2e \quad (5)$$

may take place, dependent on the conditions.

Reaction 1 is the desirable reaction; the electrons required are supplied by Reaction 2, but part of the electrons supplied by this Reaction 2 will join the undesirable Reaction 3 taking place to a greater or less extent.

The alkalinity of the reaction mixture is reduced by Reaction 4 which proceeds slowly as compared with the other reactions. According to Reaction 5 the mercury is attacked.

Up to now in these production processes under the reaction conditions used, it has been impossible to obtain high yields, such as 90% and higher.

Thus a process for the preparation of sodium chlorite by means of sodium amalgam is known, the only conditions of this known process being that the amalgam should contain 0.8–1 g. sodium per litre and the aqueous chlorine dioxide solution should be alkaline (e.g. 0.1 N). Further in this process too great an excess of alkali was to be avoided and the mercury should not be attacked under the circumstances of the reduction. A condition of maintaining definite potential difference between the amalgam and the aqueous liquid is not taught by this known process.

According to another known process the side reaction, according to which the chlorine dioxide is reduced to chloride, is avoided by lowering the content of alkali metal in the amalgam to below 0.1%.

When carrying out the process according to the particulars known from the literature so far, the yield will remain low. Here the yield is meant to be the fraction of the amount of chlorine dioxide molecules converted into chlorite molecules ($ClO_2$ yield). The fraction of the amount of alkali or earth alkali chlorite molecules (alkai or earth alkali yield), as also the molecule fraction of chlorite in the total quantity of salt mixture produced (molecular yield), as also the weight fraction of chlorite in the total quantity of salt mixture produced (weight yield) are equal to the $ClO_2$ yield under the most usual circumstances.

According to my invention the total content of alkali or earth alkali in the amalgam is not kept within certain limits in order to obtain optimal results, but the potential difference between the amalgam and the aqueous liquid is maintained at a value between +0.5 v. and —2.0 v., especially between —0.5 v. and —1.5 v., preferably at —0.5 v., said value being at any rate maintained or approximated at one or more points of the reactor, in which the reaction takes place, by mutually adjusting the content of alkali or earth alkali metal in the amalgam and the content of chlorine dioxide in the aqueous liquid. Only in this way can optimal yields of the final product be obtained, particularly when the amalgam and the aqueous liquid are passed through the reactor in parallel flow. When the potential difference exceeds the limits mentioned, the yield of final product is greatly decreased. These values relate to a measurement of the potential difference expressed as the potential of the amalgam with respect to a saturated calomel electrode positioned in the aqueous liquid, which measurement was carried out according to European practice.

When another standard electrode is used, the potential difference to be maintained will range between values which differ from the values mentioned according to the potential difference between the other standard electrode and the saturated calomel electrode.

Under the most favourable conditions a yield of over 98% can be obtained in a continuous process by the practice of the present invention.

The velocity of the above-mentioned Reaction 3 is dependent on the temperature and the potential difference between the amalgam and the aqueous chlorine dioxide solution. This reaction proceeds progressively more quickly as the potential, expressed according to European practice, is lower. Also when the temperature is increased, this reaction proceeds progressively more quickly, so that the yield decreases when the temperature is increased while the potential difference remains constant.

I have also found that at the high potentials of the area according to the invention, the mercury is attacked by $ClO_2$ and by chlorite, which attack is moreover dependent on the temperature. When the potential difference to —0.3 v. and the temperature 25° C., this attack is negligible, at 0.0 v. it is clearly noticeable, above that value it rapidly increases.

When the process is carried out in practice the maining of constant potentials between 0.0 and —0.5 v. proved to make demands on the control, which demands cannot be met with the means which are at present available; attempts in this direction gave great fluctuations both in a positive and in a negative sense. It is quite practicable to maintain potentials of over 0.0 v., e.g.+0.3 v.; in spite of a certain attack of mercury a good yield of chlorite can be obtained, which chlorite for the majority of appliction possibilities will have to be freed from the mercury compounds formed. On account of this drawback and the fact that it is practically impossible to effect potential differences between 0.0 and—0.5 v., I prefer to operate in the range between —0.5 and —1.5 v. Since according to Reaction 3 the reduction from chlorite to cloride increases when the potential difference decreases, I preferably aim at a value close to —0.5 v. The velocity of Reaction 3 increases with an increased temperature; this is a reason on the one hand for keeping the temperature low, and on the other hand for making the difference below —0.5 v. smaller according as the temperature is higher.

As already observed, I can provide a previously fixed potential difference at a certain place in the reactor by taking care that at that place the concentration of the alkali or earth alkali metal of the amalgam and of the $ClO_2$ of the aqueous liquid are mutually adjusted. When for instance, a reactor through which both liquids are passed in parallel flow, is used, it is clear that, when a special potential difference at one single point of the reactor is maintained, the result will not yet be that the potential difference is the same in the whole reactor. As a result of the reaction the concentrations of the alkali or the earth alkali metal in the amalgam and of the chlorine dioxide in the aqueous liquid will decrease and thus the potential difference may change. Therefore it is also possible that in part of the reactor a potential difference e.g. within the practically non-realizable area of −0.5 to 0.0 v. occurs when at a point of the reactor the potential difference is adjusted at, for instance, −0.6 v.

With the application of such a reactor it is possible to control the potential difference close to the inlet by mutually adjusting the concentrations of the amalgam and the aqueous liquid supplied. Close to the outlet the potential difference will depend on the ratio between the quantities of amalgam and aqueous solution supplied and on the fractions of the raw materials that have reacted. The magnitude of the fractions that have reacted is for a large part determined by the construction of the reactor, the potential difference close to the outlet of the reactor can, however, be adjusted by controlling the ratio between the quantities of amalgam and aqueous liquid supplied thereto.

The process variables to be controlled at a special temperature are, consequently, the alkali or earth alkali metal concentration of the amalgam, the $ClO_2$ concentration of the aqueous liquid and the quantities of amalgam and aqueous liquid supplied to the reactor per unit of time depending on various places in the reactor at which the potential differences are to be maintained.

When earth alkali metal is used in the amalgam a lower yield will be obtained than when an alkali metal is used, under otherwise the same circumstances. The difference in yield when earth alkali metal as compared with alkali metal is used, increases with a potential difference decreasing below −0.5 v.

A smooth production can be attained in a continuous process in a vertical reactor by passing the amalgam and the solution of the chlorine dioxide vertically downward in parallel flow, the starting materials being continuously or uninterruptedly supplied and the final product being continuously or uninterruptedly discharged in which process the potential difference is kept constant at one place but preferably at two places, e.g. both in the upper and lower part of the reactor, at a value below and as closely as possible to −0.5 v., which can be attained by not only controlling the alkali or earth alkali metal concentration in the amalgam and the concentration of the chlorine dioxide in the aqueous liquid, but also by controlling the quantities of the amalgam and/or of the aqueous liquid which are supplied to the reactor per unit of time. The course of the reaction in the reactor may also be further controlled by changing the concentration of one of the reacting substances and/or the quantity of the reaction liquids in the mean time, e.g. by an interim supply of one or both of the liquids in a higher, lower or equal concentration.

In order to obtain a final product of a maximal concentration the preferred initial liquid is a solution of the chlorite desired, in which so much chlorine dioxide is dissolved that the concentration is as high as possible. The chlorite content in the solution is increased in the course of the process.

The chlorine dioxide solution is generally prepared by absorption from a gas mixture; the $ClO_2$ concentration in the liquid may be raised by reducing the temperature and increasing the partial pressure of $ClO_2$ in the gas mixture. However, the latter is bound by certain limits on account of the danger of explosion; therefore care is generally taken that the maximum partial $ClO_2$ pressure remains below 100 mm. Hg. Also when the concentration of the chlorine dioxide is low and there is no special cooling, the $ClO_2$ concentration which can be obtained is still sufficient to have the process proceed satisfactorily. Thus approximately 3.5 g. $ClO_2$ can be dissolved per litre in a 20% sodium chlorite solution at 25° C. when this sodium chlorite solution is treated with a gas, in which the partial $ClO_2$ pressure amounts to 35 mm. This concentration of chlorine dioxide in the solution requires a sodium concentration of approximately 0.010% by weight in the amalgam, dependent on the intensity of stirring of the amalgam and the aqueous solution, to obtain at 25° C. a potential difference between the amalgam and the sodium chlorite solution of −0.5 v. Under these conditions a yield of over 98% can be obtained at room temperature.

By way of example the annexed graph (Figure 1) shows the yield expressed in percentages as a function of the potential difference $E_H$ at the bottom of or exit from the reactor and the potential difference $E_0$ at the entrance to or top of the reactor, when sodium amalgam is used, the reactor being constructed in such a way and the working circumstances being such that the initial concentration of the sodium in the amalgam is 0.0031% by weight and the final concentration of the sodium 0.0006% at a temperature of 20° C. From this graph it is apparent, that under the circumstances mentioned a yield of at least 97% can be obtained when the potential difference at the top of the reactor is −0.8 v. and at the bottom of the reactor −0.75 v.; the yield may be at least 98% when the potential difference at the bottom of the reactor is e.g. −0.55 v. and at the top of the reactor −0.58 v.

The numerical designations under the symbols $V_{S.C.E.}$ in said chart are meant to indicate the potential difference between the amalgam and a saturated calomel electrode when measured as heretofore described.

Even if the potential difference at the bottom of the reactor is constantly higher than −0.5 v., e.g. +0.2 v. a high yield can yet be obtained.

An increase in the yield and the production can be obtained at the same temperature and with the same potential differences at the top and at the bottom of the same reactor by increasing the concentration of e.g. the alkali or earth alkali metal at the top of the reactor, with the same quantity of amalgam added to which increased concentration the concentration of the chlorine dioxide in the aqueous solution at the top of the reactor and the quantity of aqueous solution supplied should be adapted, or, e.g. by increasing the quantity of amalgam supplied with the same concentration of the alkali or earth alkali metal in the amalgam at the top of the reactor to which the quantity of the other liquid supplied should be adapted.

If, the potential difference to be kept stable and the maintaining thereof is not controlled as described above, at any rate at the beginning of the reaction, these potential differences will suddenly become negative or positive, so that the reaction can no longer be kept in hand and an undesirable degree of attack of the mercury and/or an undesirable reduction of the chlorite cannot be prevented or cannot be kept within reasonable limits, as a result of which the yield of the final product will decrease considerably, as already stated above, an adjustment and maintenance of a potential difference between 0.0 v. and −0.5 v. at the top of the reactor is yet practically impossible.

In order to increase the capacity of the apparatus the surface of the amalgam, particularly the surface of the boundary layers of the amalgam and the aqueous liquid, should be enlarged by introducing a suitable filling in the reactor, which filling divides the amalgam stream into as many small streams as possible. A division into drops should be avoided as much as possible, since each separate drop can give rise to unfavourable secondary reactions, especially so if the sizes of the drops differ considerably among themselves, since the content of the alkali or earth alkali in these drops cannot be adapted to the chlorine dioxide content of the surrounding aqueous solution. Contact between the amalgam and a solid wall should also be prevented as much as possible, since a very thin but slowly flowing liquid layer will be formed between the solid wall and the amalgam, in which layer it will not be possible to control the content of chorine dioxide according to the conditions.

With a usual voluminous filling such as glass beads or Raschig rings the amalgam which has once struck the wall of the reactor will not easily be withdrawn therefrom. When the filling is of little volume or sparse, a small flow of amalgam striking the wall will be reflected. Consequently a sparse filling, on the one hand separating the flow of amalgam and on the other hand leaving space for the reflection of the amalgam against the wall, will effect an even distribution of the amalgam over the section of the column. Besides a favourable sparse filling will yield a minimal detrimental surface, since the surface of contact of a small flow of amalgam with a solid object is detrimental to the total yield of the process, on account of the intermediate thin layer of aqueous solution.

Consequently, thin bodies are preferably chosen as reactor filling, e.g. gauze like grids, positioned in the reactor at fairly great distances, separating the amalgam supplied into separate, uninterrupted flows, without drops being substantially formed. Preferably a filling as described in the application Serial No. 492,589, filed March 7, 1955, is used for this purpose.

The invention is further illustrated by means of the annexed drawings 2–5, in which:

Fig. 3 represents a vertical longitudinal section of a vertical reactor, according to the invention with a filling;

Fig. 4 is a top view of a gauze-like filling element, being an example of a filling for application in the process according to the invention;

Fig. 5 represents on an enlarged scale a detail of a series of superposed filling elements according to Fig. 4.

Figure 1:
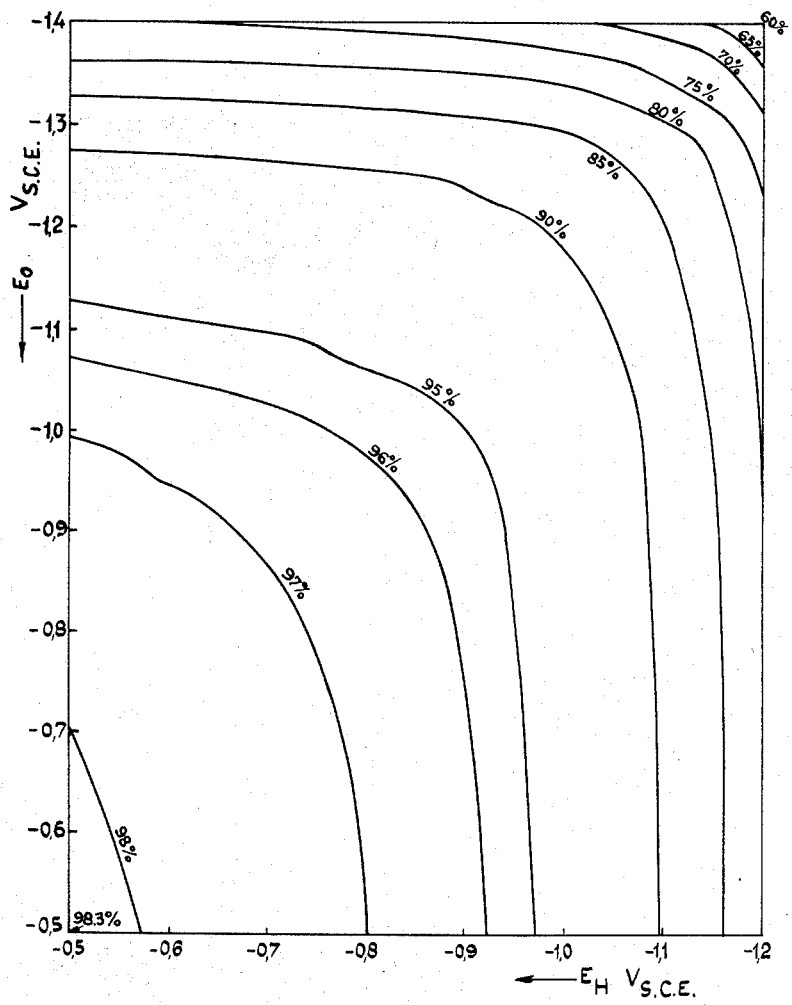
Figure 2:
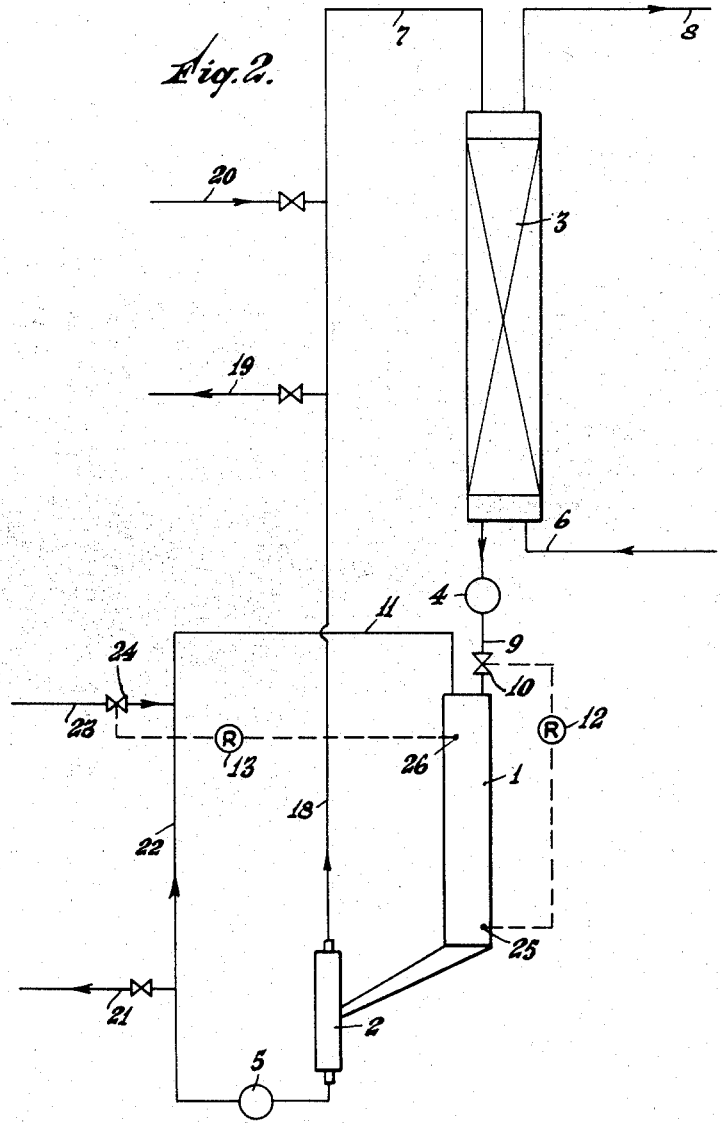
Fig. 2 represents a flow sheet of the process according to the invention, in which chlorine dioxide gas is dissolved in water or in an aqueous solution, and in which process this chlorine dioxide gas solution is continuously reacted with alkali or earth alkali amalgam in a vertical reactor.

According to Fig. 2 the product to be reduced, i.e. chlorine dioxide gas which has been strongly diluted with air, is passed through line 6 at the bottom of absorber 3, water or an aqueous solution being introduced at the top of the absorber through line 7. The spent gases, i.e. the spent air, are removed through line 8. In this absorber 3 the aqueous solution of chlorine dioxide is prepared, which solution is introduced into the top of reactor 1 through line 9 and control valve 10 by means of pump 4. Simultaneously amalgam is introduced into the top of this reactor through line 11. The two liquids, i.e. the amalgam and the chlorine dioxide solution mutually react in the reactor 1, after which they i.e. the amalgam and the aqueous liquid now containing the chlorite in a higher concentration, are discharged from the bottom of this reactor to device 2, in which device the two liquids are separated. From the top of device 2 the aqueous liquid is entirely discharged through lines 18 and 19 or through line 18 and partly through line 19, the balance of this liquid being passed back into the absorber again after the supply of a fresh quantity of water through line 20 to the line 7. The liquid discharged through line 19 forms the desired product. The amalgam is entirely discharged from the bottom of device 2 via pump 5 and line 21 to the apparatus for the preparation of the amalgam or is partly discharged to said apparatus, the balance being passed back again to reactor 1 through line 22, and after the supply of concentrated amalgam (through line 23 and control valve 24) through line 11. The cycle of the aqueous liquid comprises line 7, absorber 3, pump 4, line 9, control valve 10, reactor 1, device 2 and line 18, connecting to line 7. The cycle of the amalgam comprises line 11, reactor 1, device 2, pump 5, line 22 (line 21, the apparatus for the preparation of the amalgam, line 23 and control valve 24 resp.), line 22 (or control valve 24) connecting to line 11. Potential measuring device 25 at the bottom of reactor 1 will adjust the control valve 10 by means of a controlling device 12, as a result of which the passing velocity of the aqueous liquid of absorber 3 is controlled, the potential measuring device 26 near the top of reactor 1 adjusting the control valve 24 by means of a controlling device 13, as a result of which the supply of the concentrated amalgam is adjusted.

In Fig. 3 the vertical reactor is indicated by 1, said reactor being provided with the supply line 9 for the aqueous solution of chlorine dioxide, said line traversing the lid, supply line 11 for the amalgam, measuring device 26 in the top of reactor 1 and device 25 at the bottom of reactor 1. The bottom of reactor 1 is connected to device 2. This reactor is filled with gauze-like grids 27, serving as filling elements, which grids are superposed in such a way that the meshes have been displaced with respect to one another, i.e. diagonally, as indicated in Fig. 5. The bars of these gauze-like grids show a round, vertical cross-section. A flow of amalgam falling upon such a thin bar will be split into two parts, while few or no drops at all are formed. These bars are kept as small as possible in order to keep the surface of contact between the material of the filling and the amalgam, which surface is detrimental to the yield, as small as possible. Grids 27 are spaced apart at some distance by bars 28.

I claim:

1. A continuous process for producing chlorites of the group consisting of alkali chlorite and earth alkali chlorite which comprises the steps of passing a recycling aqueous solution of said chlorites through an absorber while passing chlorine dioxide through said absorber, withdrawing from said absorber an aqueous solution of said chlorite containing dissolved chlorine dioxide, passing said aqueous solution containing dissolved chlorine dioxide through a control means and into a reactor, simultaneously passing a recycling amalgam selected from the group consisting of alkali amalgam and earth alkali amalgam into said reactor, said aqueous solution and said amalgam being in concurrent flow, withdrawing the reaction mixture from said reactor and separating the reacted amalgam from the aqueous solution of said chlorites, said aqueous solution having a greater concentration of chlorites than that aqueous solution when entering said reactor, recycling said reacted amalgam to said reactor, passing concentrated amalgam through a control means and into the recycling amalgam stream, recycling said aqueous solution containing said chlorites in greater concentration to said absorber, withdrawing from the recycling aqueous solution a portion of said concentrated chlorite solution and simultaneously adding an equal portion of water, measuring the potential difference between the reacting amalgam and chlorine dioxide solution in said reactor by means of at least one standard electrode positioned in said reacting aqueous solution and controlling the potential difference between the reactants, said measured potential difference between the reactants operating said two control means to adjust the content of the reducing metal in the amalgam and the amount of chlorine dioxide available for reduction relative to each other in accordance with the measured potential difference, said potential difference being maintained between −0.5 v. and −1.5 v. substantially throughout said reactor as measured with reference to the potential difference between a saturated calomel electrode immersed in said aqueous solution in contact with said amalgam and said amalgam iteslf.

2. The method of claim 1 in which the potential difference between said amalgam and said aqueous chlorine dioxide solution is maintained between about −0.5 v. and about −1.5 v. at the beginning of the reaction.

3. The method of claim 1 in which the potential difference between said amalgam and said aqueous chlorine dioxide solution is maintained at substantially −0.5 v.

4. A continuous process for producing chlorites of the group consisting of alkali chlorite and earth alkali chlorite which comprises the steps of passing a recycling aqueous solution of said chlorites through an absorber while passing chlorine dioxide through said absorber, withdrawing from said absorber an aqueous solution of said chlorite containing dissolved chlorine dioxide, passing said aqueous solution containing dissolved chlorine dioxde through a control means and into a reactor, simultaneously passing a recycling amalgam selected from the group consisting of alkali amalgam and earth alkali amalgam into said reactor, said aqueous solution and said amalgam being in concurrent flow, withdrawing the reaction mixture from said reactor and separating the reacted amalgam from the aqueous solution of said chlorites, said aqueous solution having a greater concentration of chlorites than that aqueous solution when entering said reactor, recycling said reacted amalgam to said reactor, passing concentrated amalgam through a control means and into the recycling amalgam stream, recycling said aqueous solution containing said chlorites in greater concentration to said absorber, withdrawing from the recycling aqueous solution a portion of said concentrated chlorite solution and simultaneously adding an equal portion of water, measuring the potential difference between the reacting amalgam and chlorine dioxide solution in said reactor adjacent to the inlet and outlet by means of two standard electrodes positioned in said reacting aqueous solution and controlling the potential difference between the reactants, said measured potential difference between the reactants operating said two control means to adjust the content of the reducing metal in the amalgam and the amount of chlorine dioxide available for reduction relative to each other in accordance with the measured potential difference, said potential difference being maintained between −0.5 v. and −1.5 v. substantially throughout the reactor as measured with reference to the potential difference between a saturated calomel electrode immersed in said aqueous solution in contact with said amalgam and said amalgam itself.

References Cited in the file of this patent

UNITED STATES PATENTS

| 1,532,543 | Newcomb | Apr. 7, 1925 |
| 1,951,035 | Parker | Mar. 13, 1934 |

FOREIGN PATENTS

| 644,309 | Great Britain | Oct. 11, 1950 |
| 480,542 | Canada | Jan. 22, 1952 |